Oct. 4, 1932.  M. B. CAMERON  1,880,782
FRICTION DRAFT GEAR
Original Filed March 13, 1923
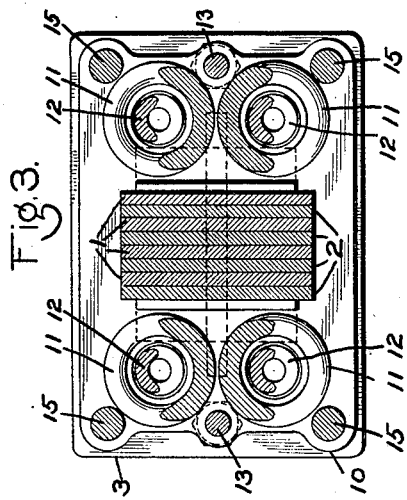
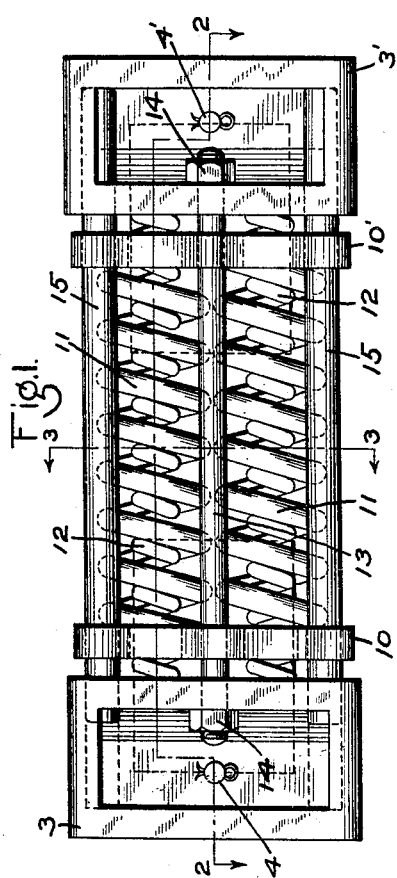
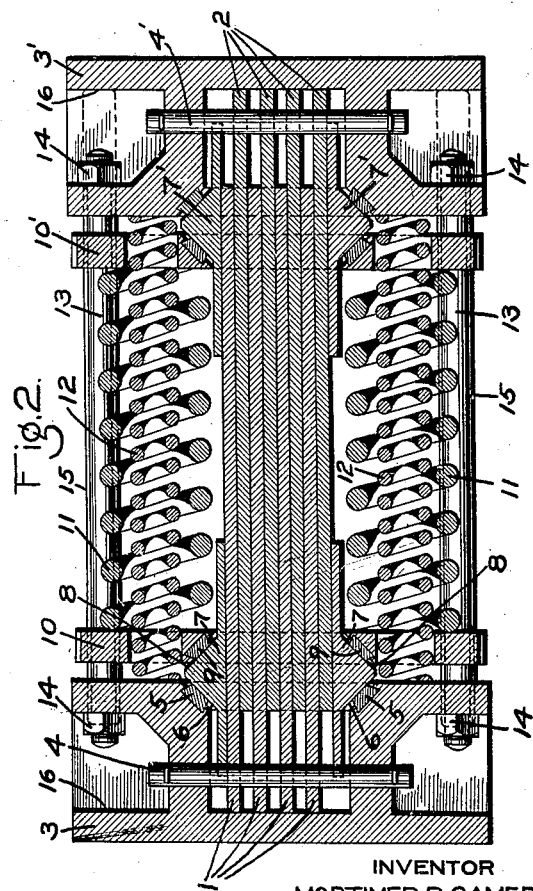
INVENTOR
MORTIMER B. CAMERON
BY *Wm. M. Cady*
ATTORNEY Patented Oct. 4, 1932

1,880,782

UNITED STATES PATENT OFFICE

MORTIMER B. CAMERON, OF EDGEWOOD, PENNSYLVANIA, ASSIGNOR, BY MESNE ASSIGNMENTS, TO UNIVERSAL DRAFT GEAR ATTACHMENT COMPANY, OF CHICAGO, ILLINOIS, A CORPORATION OF ILLINOIS

FRICTION DRAFT GEAR

Application filed March 13, 1923, Serial No. 624,789. Renewed May 27, 1932.

This invention relates to friction draft gear for railway cars and more particularly to a friction draft gear of the type employing alternated friction plates.

The principal object of my invention is to provide an improved friction draft gear of the above type.

In the accompanying drawing; Fig. 1 is an elevational view of a friction draft gear embodying my invention; Fig. 2 a section on the line 2—2 of Fig. 1; and Fig. 3 a section on the line 3—3 of Fig. 1.

As shown in the drawing, the friction draft gear may comprise groups of alternated friction plates 1 and 2 arranged centrally of the draft gear. The projecting ends of the plates 1 extend into a central recess of a housing 3, the plates being secured to said housing by means of a pin 4. The housing 3 is provided with oppositely inclined faces preferably having wear plates 5 adapted to engage corresponding oppositely inclined friction faces 6 of wedge blocks 7 disposed at opposite sides of the friction plates 1 and 2.

The wedge blocks 7 are also provided with oppositely inclined friction faces 8 adapted to engage corresponding friction faces of wear plates 9 carried by a longitudinally movable spring follower 10. At the opposite end of the draft gear, a housing 3' is connected to the ends of the plates 2 by a pin 4' and wedge blocks 7' are provided with oppositely inclined friction faces adapted to engage wear plates carried by the housing 3' and the spring follower 10', the construction being the same as that provided at the other end of the gear.

Interposed between the followers 10 and 10' at the four corners are coil springs 11 and within each of said springs is a coil spring 12 which extends through an opening in each of the followers 10 and 10' and engages the opposite housings 3 and 3'.

The parts are maintained assembled by means of two tie rods 13 which extend through openings in the followers 10 and 10' and in the housings 3 and 3', nuts 14 being applied to the opposite screw-threaded ends of the rods 13.

Four rods or columns 15 are disposed at the four corners of the gear, said rods extending through openings in the spring followers 10 and 10' and openings in the inner flange portions of the housings 3 and 3'.

The opposite ends of said rods are adapted to engage the wall 16 of each housing 10 and 10' when the gear has been compressed to a predetermined extent, so as to receive the ultimate force of impact and thus protect the friction plates 1 and 2 against injury.

In operation, the wedge block 7 are normally subjected to the initial compressive force of the springs 11 which act on the spring followers 10 and 10', so that the wedge blocks 7 are pressed inwardly against the friction plates 1 and 2 and thus said plates are maintained under compression.

When one of the housings 3 and 3' is subjected to pressure under buffing or draft stress, the housing will move inwardly, causing a relative longitudinal movement between the two groups of alternated friction plates 1 and 2. At the same time, the movement of the wedge blocks 7 is resisted by the increasing resistance due to the further compression of the springs 11 acting on the spring followers 10 and 10' and thus the wedge blocks 7 are caused to exert an increasing inward pressure on the friction plates 1 and 2 as the draft gear is compressed.

If the compressive movement of the draft gear exceeds a predetermined amount, the rods or columns 15 will engage the inner walls 16 of the housings 3 and 3', thus protecting the friction plates 1 and 2 against excessive impacts.

When the buffing or draft stress is relieved, the release springs 12 act on the housings 3 and 3' to relieve the wedge blocks 7 of pressure, so that the inward pressure on the friction plates 1 and 2 being reduced, the draft gear parts readily return to normal release position.

Having now described my invention, what I claim as new and desire to secure by Letters Patent, is:—

In a friction draft gear, the combination with a group of alternated longitudinally movable friction plates, of a housing anchored to and enclosing the ends of alternate plates of said group of friction plates at one end of the draft gear, a housing anchored to and enclosing the ends of the other plates of said group of friction plates at the other end of the draft gear, a spring resistance, a lateral pressure creating means operating against the outer sides of said friction plates, and longitudinally disposed rods associated with said housings and adapted to engage said housings upon a predetermined longitudinal movement of one housing, to thereby prevent further longitudinal movement of said friction plates.

In testimony whereof I have hereunto set my hand.

MORTIMER B. CAMERON.